Figure 5:
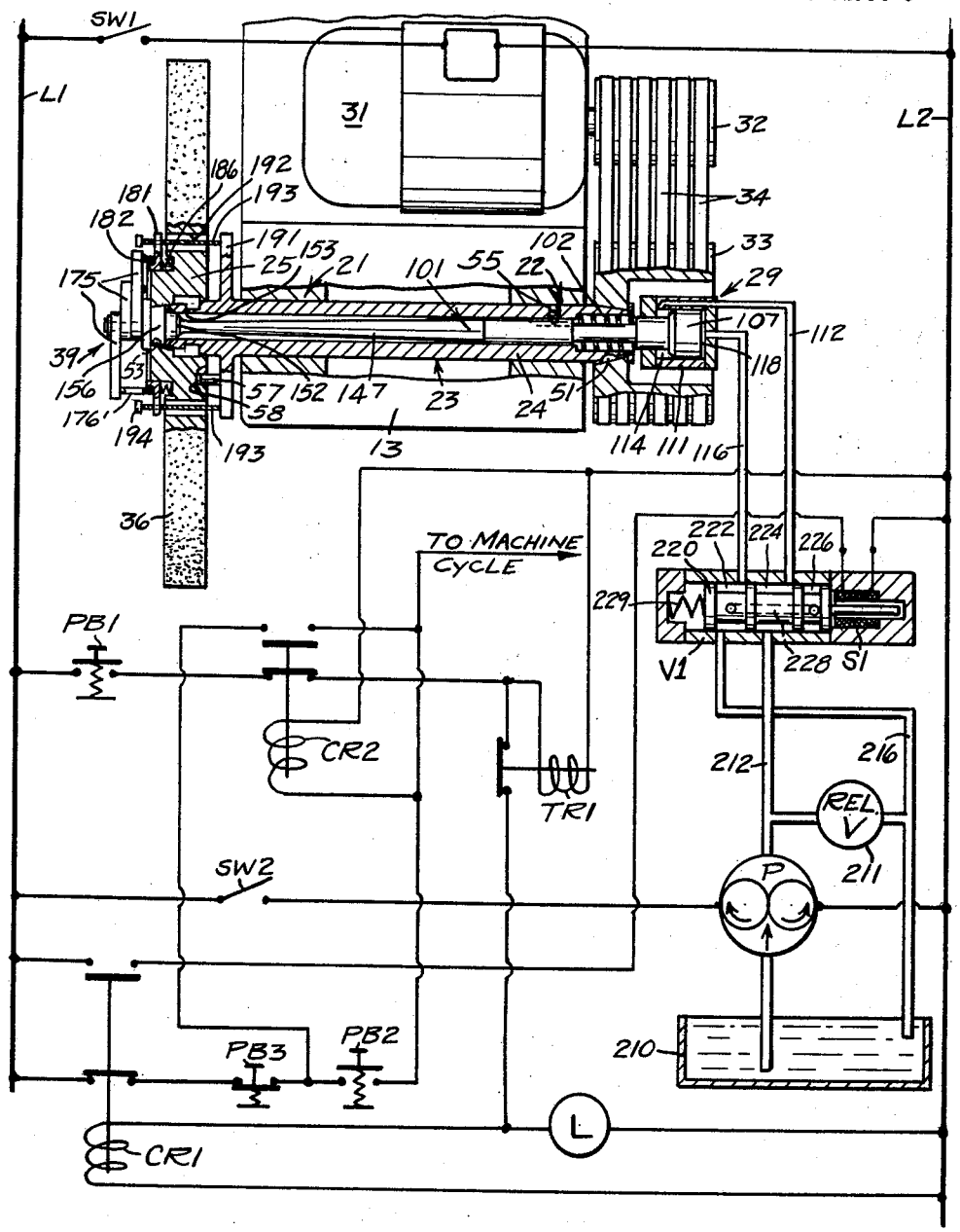

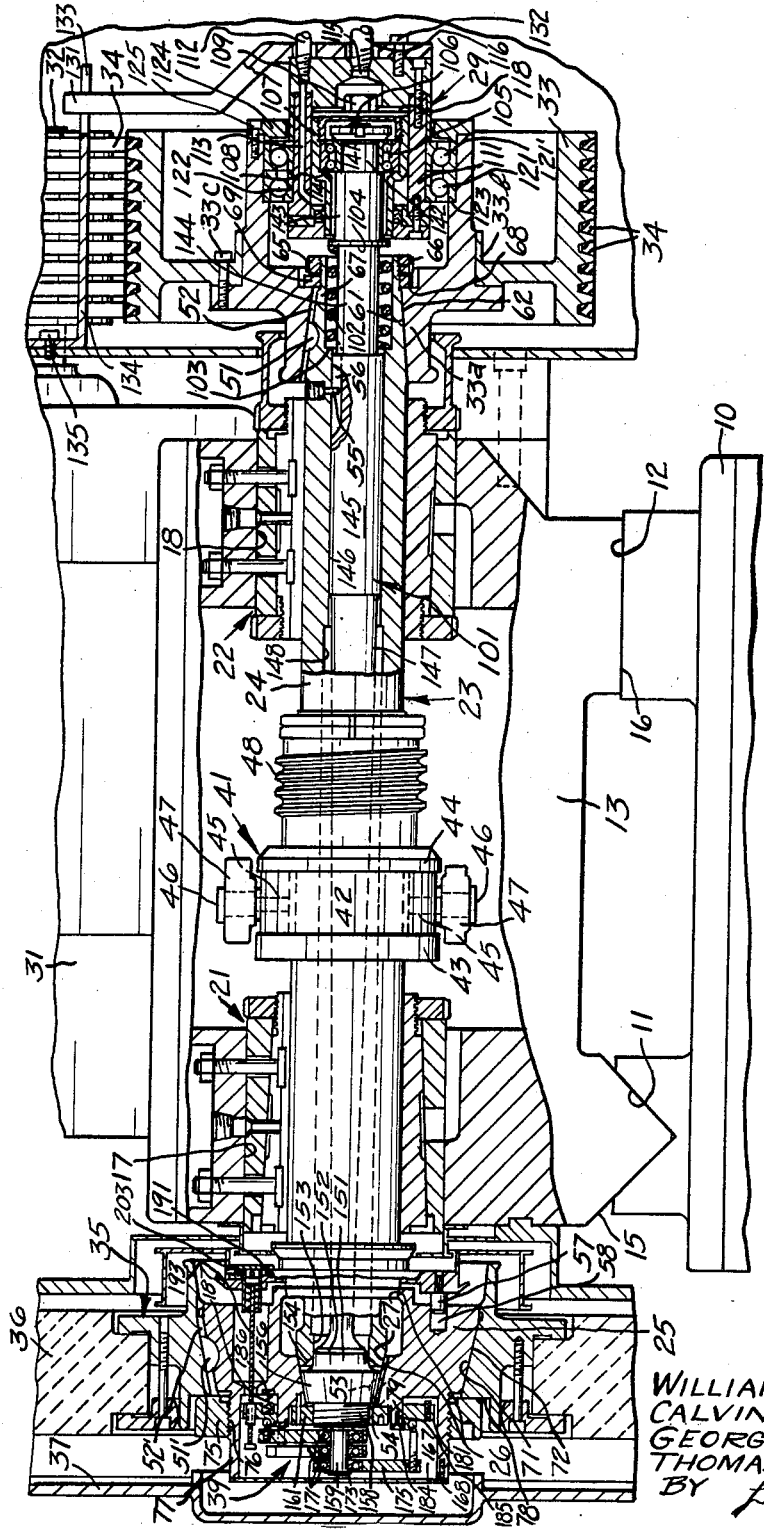

Oct. 22, 1963    W. R. BACKER ETAL    3,107,550
DYNAMICALLY ACTUATED BALANCING MEANS
Filed July 21, 1960    4 Sheets-Sheet 2
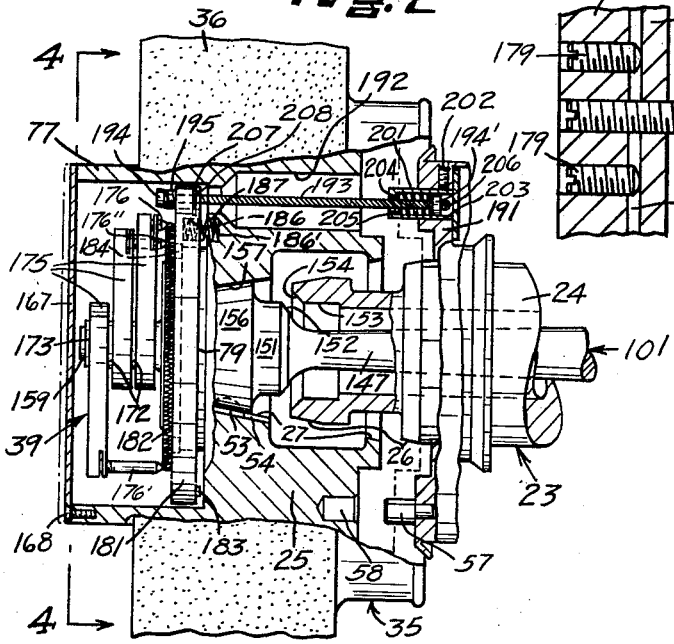
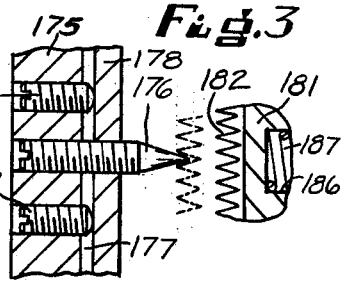
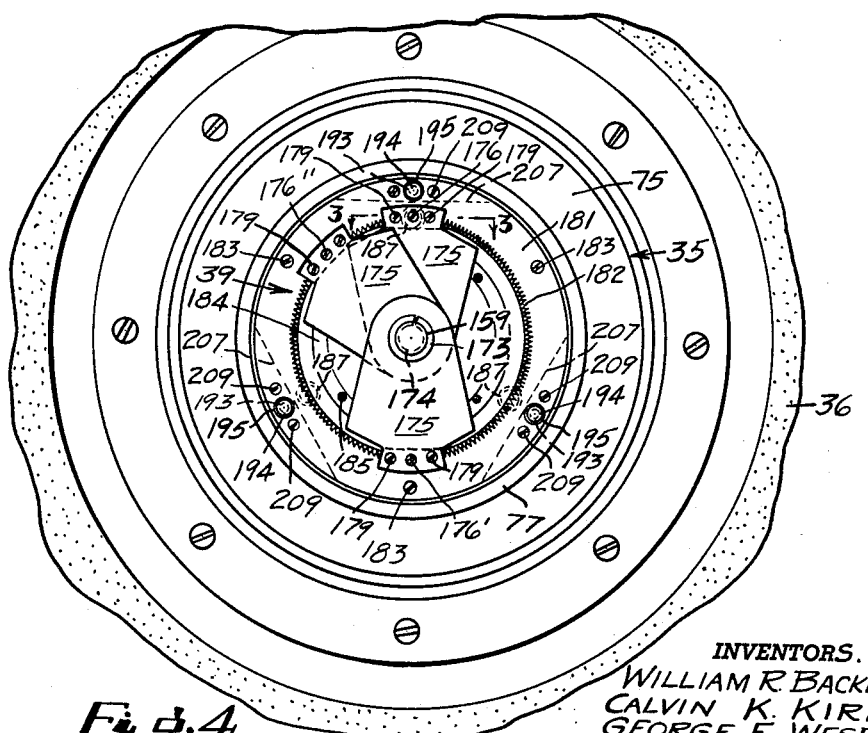
INVENTORS.
WILLIAM R. BACKER
CALVIN K. KIRK
GEORGE E. WESPI
THOMAS F. STEVENS
BY Lewis M. Smith, Jr.
ATTORNEY United States Patent Office 3,107,550
Patented Oct. 22, 1963

3,107,550
DYNAMICALLY ACTUATED BALANCING MEANS
William R. Backer, Holden Mass., Calvin K. Kirk, Western Springs, and George E. Wespi, Chicago Ridge, Ill., and Thomas F. Stevens, Shrewsbury, Mass., assignors to Norton Company, Worcester, Mass., a corporation of Massachusetts
Filed July 21, 1960, Ser. No. 44,382
17 Claims. (Cl. 74—573)

The instant invention relates to dynamically actuated balancing means, and more particularly to dynamically actuated balancing means for a rotating element selectively automatically operable while a rotating element to be balanced thereby is being rotated about a predetermined axis.

The prior art teachings with respect to such balancing means are generally characterized by the application of such automatic balancing means to a structural configuration in which a rotating element to be balanced is secured to and rotatable with a spindle assembly rotatably mounted in a suitable supporting structure by means of first and second bearing assemblies spaced apart longitudinally of the spindle assembly. Such structural configurations are typically characterized by an arrangement for selectively maintaining the first bearing assembly in operable engagement with the spindle supporting means and releasing the second bearing assembly from operable engagement with the supporting means in order to permit operation of the dynamically actuated balancing means. Moreover, such an arrangement makes it necessary to incorporate a spherical bearing surface or the like in the first longitudinally spaced bearing assembly in order to accommodate angular displacement of the spindle assembly relative to its normal axis of rotation when the second bearing assembly is released for the balancing operation.

In contrast to the prior art teachings, the instant invention contemplates an arrangement in which a rotating element mounted upon and rotatable with a suitable elongated spindle assembly may be balanced by an automatically operable dynamically actuated balancing means without releasing the elongated spindle assembly upon which it is mounted from either of a pair of longitudinally spaced bearing assemblies arranged to support the spindle assembly for rotation about a predetermined fixed axis of rotation.

An object of the present invention is the provision of a dynamically actuated balancing means for a rotatable object mounted upon a spindle for rotation therewith, operable automatically to balance the rotating object when the object is displaced a predetermined amount longitudinally of the spindle upon which it is supported.

Another object is the provision of dynamically actuated balancing means for balancing a rotating element supported on and rotatable with a suitable spindle assembly operable to balance the rotating element without releasing any of a plurality of bearings arranged to support the spindle assembly for rotation in fixed relation to a suitable supporting means.

Still another object of this invention is to provide a dynamically actuated balancing means for a rotatable element selectively automatically operable when the rotatable element is conditioned for balancing, all in response to a single continuous motion of a suitably disposed actuating means.

Yet another object is to provide a semi-automatic balancing means selectively operable to balance a rotating element while the rotating element is sustained upon and rotated by a single elongated resilient member.

A further object is the provision of semi-automatic balancing means for a rotating element incorporating a plurality of unbalanced members respectively rotatably mounted upon a single centrally disposed supporting member for rotation thereabout.

A final object is the provision in as assembly including a rotating element supported on a suitable elongated spindle assembly for selective displacement of the rotating element between a first position in which the rotating element is rotated about a fixed predetermined axis under its normal operating conditions and a second position in which the rotating element is conditioned for balancing, of a selectively operable semi-automatic balancing means including a plurality of balancing elements constrained against rotation when the rotatable element is disposed in its first position and released for rotation to balance the rotating element when the rotating element is disposed in its second position.

Figure 6:
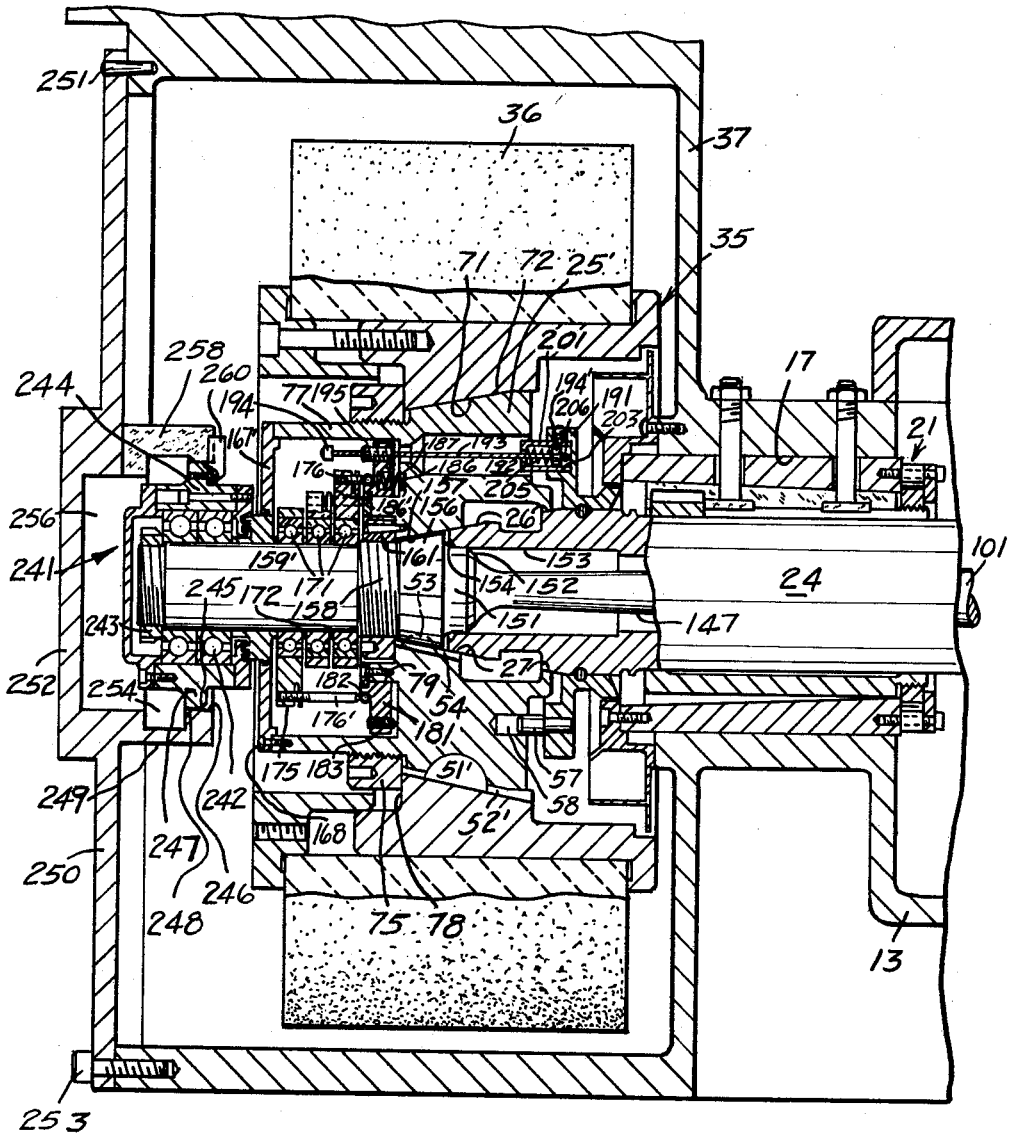

Other objects and advantages will become apparent from consideration of the following description of the instant invention, especially as it relates to the showing in the accompanying drawings wherein:

FIG. 1 is a side elevation partially broken away of a preferred embodiment of the instant invention as applied to a grinding machine, FIG. 2 is an enlarged detailed showing, partially sectioned, of a portion of the preferred embodiment of the instant invention as illustrated in FIG. 1, FIG. 3 is a detailed sectional view of a feature of the preferred embodiment of the instant invention taken substantially on line 3—3 of FIG. 4, FIG. 4 is an end view, partially broken away, of a portion of the preferred embodiment of the instant invention taken on line 4—4 of FIG. 2, FIG. 5 is a simplified schematic representation of the preferred embodiment of the instant invention shown in operative relation to the requisite electrical circuit and hydraulic system for semi-automatic operation of the device illustrated according to the teachings of the instant invention, and FIG. 6 is a vertical section partially broken away of an alternative embodiment of the instant invention.

Referring now to the drawings wherein like reference numerals identify like or corresponding parts, FIG. 1 illustrates the application of the instant invention to a grinding machine including a base assembly 10 provided on its upper surface with a V-way 11 and a flat way 12 arranged to support a wheel slide assembly 13 in sliding engagement with base assembly 10 by engagement with a V-slide 15 and a flat slide 16. The wheel slide assembly 13 is provided with a pair of spaced coaxial circular openings 17 and 18 respectively arranged to receive plane radial bearing assemblies, generally designated by reference numerals 21 and 22, in turn supporting an elongated wheel spindle assembly, generally designated by the reference numeral 23, including a first longitudinally relatively fixed portion 24 and a second portion 25 relatively movable longitudinally, interfitted by means of coacting external tapered surface 26 and internal tapered surface 27 respectively formed on portion 24 and portion 25, the respective portions of spindle assembly 23 being interconnected for relative displacement by a linear actuator mechanism generally designated by the reference numeral 29 and described in further detail below.

The wheel slide assembly 13 also supports a drive motor 31 mounted thereon and provided with a drive sheave 32 disposed in alignment with a spindle sheave assembly 33 and interconnected therewith by means of a plurality of drive belts 34.

The elongated wheel spindle assembly 23 projecting at both ends from the wheel slide assembly 13 supports the spindle sheave assembly 33 and the linear actuator mechanism 29 at one end thereof and supports a conventional wheel sleeve assembly, generally designated by the reference numeral 35, and a rotating element comprising a grinding wheel 36 secured to the wheel sleeve assembly 35, as by a wheel retaining ring, on the other end thereof along with an automatic dynamically actuated balancing assembly, generally designated by reference numeral 39 and described in further detail below. The grinding wheel 36 may conveniently be enclosed by a generally conventional wheel guard assembly 37 secured to the wheel slide assembly 13 by any suitable means such as attachment bolts or the like and spaced from the left hand face of the grinding wheel 36 and the spindle assembly 23, as shown in FIG. 1, to accommodate the operation of linear actuator mechanism 29 in the manner described further below.

While the conventional spindle reciprocating mechanism generally designated by reference numeral 41 forms no part of the instant invention, some elements of such a mechanism are illustrated in FIG. 1 in operable relation to the spindle assembly 23 in order clearly to indicate that the various features of the instant invention as applied to a grinding machine are fully compatible with the type of spindle reciprocating mechanism frequently incorporated in a grinding machine. The elements of a spindle reciprocating mechanism 41 illustrated in FIG. 1 include a non-rotatable sleeve 42 encircling portion 24 of spindle assembly 23 and constrained against longitudinal displacement relative to spindle assembly 23 by a pair of opposed collars 43 and 44 secured to and rotatable with portion 24 of spindle assembly 23, said sleeve 42 being provided with diametrically opposed radial openings 45 arranged to receive a pair of opposing pins 46 projecting from the respective arms 47 of a fork assembly which may be pivotally mounted for oscillation by a linkage not shown driven by a cam or eccentric not shown rotated by a worm wheel not shown in turn driven by a worm 48 secured concentrically of portion 24 of the spindle assembly 23 so that rotation of the spindle assembly 23 produces oscillation of the arms 47 of the fork assembly to effect reciprocation of the spindle assembly 23 in the bearing assemblies 21 and 22. In this arrangement sleeve 42 also serves as the thrust bearing for the spindle assembly 23. It is to be understood that the spindle reciprocating mechanism 41 may be of the type illustrated in Patents No. 1,584,717 or No. 1,808,401 or any other suitable type with the further understanding that the spindle reciprocating mechanism may be selectively activated or deactivated by suitable manual or automatic means therefor such as that illustrated in Patent No. 1,808,401 or other suitable means well known in the art.

The spindle sheave assembly 33 is secured against rotation relative to the portion 24 of spindle assembly 23 by means of a keyway 52 engaging a key 51 projecting from the portion 24 of the spindle assembly 23 and the wheel sleeve assembly 35 is secured against rotation relative to the portion 25 of spindle assembly 23 by the engagement of keyway 52′ with a key 51′ projecting from portion 25 of spindle assembly 23. In addition, the portion 25 of the spindle assembly 23 is secured against rotation relative to linear actuator assembly 29 by the engagement of a keyway 54 with a key 53 projecting from the left hand end of linear actuator assembly 29 as illustrated in FIG. 1, and the portion 24 of spindle assembly 23 is secured against rotation relative to the linear actuator assembly 29 by the engagement of a radially extending pin 55 with a longitudinal slot 56 formed in linear actuator assembly 29 adjacent the right hand end thereof, as illustrated in FIG. 1. Finally, since the linear actuator assembly 29 includes a substantially elongated element subject to a torsion load, the portions 24 and 25 of spindle assembly 23 are directly secured against relative rotation, when their respective tapered surfaces 26 and 27 are in engagement by means of a drive pin 57 projecting longitudinally from a flange on portion 24 into engagement with a recess 58 formed in portion 25.

The arrangements in the illustrative embodiment of the instant invention for mounting and maintaining the spindle sheave assembly 33 and the wheel sleeve assembly 35 in the desired orientation coaxial with and longitudinally of the spindle portions 24 and 25, respectively, will be described below.

First, the spindle sheave assembly 33, including a hub portion 33a and a replaceable rim portion 33b secured thereto by suitable attachment bolts 33c, is mounted upon the spindle assembly 23 by engagement of an internal tapered surface 61 on hub portion 33a with an external tapered surface 62 on spindle portion 24. The spindle sheave assembly is maintained in this longitudinal relationship by a threaded retaining nut 65 engaged with external threads 66 on a sleeve portion 67 projecting from the end of the portion 24 of the spindle assembly 23. If necessary, one or more spacers or washers 69 may be interposed between retaining nut 65 and the cooperating face 68 on the hub 33a of the sheave assembly 33.

Second, the wheel sleeve assembly 35 may conveniently be interfitted with the portion 25 of spindle assembly 23 by inter-engagement of an internal tapered surface 71 on wheel sleeve 35 with an external tapered surface 72 on the portion 25 of the spindle assembly 23. The inter-engagement of these respective parts may be maintained by a retaining nut 75 engaging external threads 76 on a relatively large sleeve portion 77 projecting from portion 25 of the spindle assembly. The retaining nut 75 may conveniently be provided with an inner face portion for direct engagement with a cooperating face 78 on the wheel sleeve assembly 35. From the showing in FIG. 1 it will be apparent that spindle portion 25 is further characterized by a relatively smaller sleeve portion projecting from portion 25 within and concentric of the relatively larger sleeve portion 77, for reasons to be noted further below in describing the semi-automatic wheel balancing assembly 39.

Continuing to refer to the showing in FIG. 1, the actuator assembly 29 includes an elongated spring rod generally designated by reference numeral 101 and a biasing spring 102 encircling a reduced portion of spring rod 101 constrained between a shoulder 103 formed on portion 24 of spindle assembly 23 and a flange 104 concentric of spring rod 101 so that the spring rod 101 is normally biased to the right, as shown in FIG. 1 to maintain the respective tapered surfaces 26 and 27 of portions 24 and 25 of spindle assembly 23 in interferring engagement as shown in FIG. 1. The spring rod 101 also supports a double thrust anti-friction bearing assembly 105 secured to the spring rod 101 by a retaining nut 106 engaging the inner race of the bearing assembly 105. The bearing assembly 105 in turn rotatably supports a piston assembly 107 disposed concentric of the right hand end of spring rod 101 and provided with a shoulder 108 and a threaded piston face plug 109 coacting to secure the piston assembly 107 against longitudinal displacement relative to the outer race of bearing assembly 105.

The linear actuator assembly 29 also includes a cylinder assembly 111 which may conveniently be fabricated by interconnecting cooperating parts by suitable attachment means in the manner illustrated in FIG. 1. A first fluid conduit 112 attached to the cylinder assembly 111 connects with a fluid inlet passage 113 opening into a first cylinder chamber 114 at the left hand end of the cylinder assembly as shown in FIG. 1. A second fluid conduit 116 attached to cylinder assembly 111 connects with fluid inlet passage 115 opening into a second cylinder chamber 118 at the right end of cylinder assembly 111 as shown in FIG. 1.

Since the spring rod 101 is keyed to the respective portions of the spindle assembly 23 for rotation therewith while other portions of the linear actuator assembly 29 are preferably constrained against rotation for the reasons noted below, the cylinder assembly 111 is supported by a pair of opposed thrust bearing assemblies 121 and 121′ with their respective inner races seated and secured in an annular groove 122 on the outer periphery of cylinder assembly 111 and with their outer races constrained between a shoulder 123 formed on the inner surface of a sleeve portion of the hub 33a and a suitable retaining ring 124 secured to the open end of the sleeve portion of hub 33a by suitable attachment bolts 125.

Inasmuch as fluid conduits 112 and 116 must remain attached to the cylinder assembly 111 for selective operation of the linear actuator assembly 29 in accordance with the teachings of the instant invention, it is considered more convenient to constrain the cylinder assembly 111 against rotation than to provide means for transferring fluid through the respective conduits from a stationary source with the cylinder assembly rotating. This constraint for the cylinder assembly 111 is provided by the cylinder assembly positioning lever 131 secured to the cylinder assembly 111 by suitable attachment bolts 132 and projecting radially therefrom as shown in FIG. 1 for engagement with a forked end portion 133 of a bracket 134 secured by attachment bolts 135 to a fixed mounting means such as a guard for the sheaves 32 and 33 and the drive belts 34 which may be secured in turn to the wheel slide assembly 13.

Noting that the spring rod 101 includes a substantial number of different portions each arranged to perform a specific function, these several portions of the spring rod 101 will now be described in order reading from right to left in FIG. 1. The relatively reduced threaded portion 141 is provided for threadable engagement with retaining nut 106. The adjacent bearing surface 142 supports the inner race of bearing assembly 105. The relatively enlarged section 143 provides a shoulder coacting with retaining nut 106 to restrain the inner race of bearing assembly 105 against longitudinal displacement relative to spring rod 101. In order to facilitate assembly of the biasing spring 102 on spring rod 101, the enlarged section 143 actually comprises a sleeve with flange 104 formed integrally therewith slidably engaging a reduced portion which conveniently may comprise an extension of bearing surface 142. The relatively reduced portion 144 is provided as noted above to accommodate the biasing spring 102. The enlarged elongated bearing surface 145 is disposed in slidable bearing relationship with an internal bearing surface 146 formed concentrically within spindle portion 24. The substantially elongated flexible portion 147 of relatively reduced cross section passes through a substantially enlarged central opening 148 in portion 24 so that there is clearance on all sides of portion 147 within the central opening 148.

Approaching the left hand end of spring rod 101 as illustrated in FIG. 1, a cylindrical boss 151 provided with a chamfered edge 152 is so disposed as to engage a cylindrical seat 153 in spindle portion 24 adjoining a chamfered face 154 at the end of spindle portion 24. The external tapered surface 156 is provided for engagement with the cooperating internal tapered surface 157 on spindle portion 25 which actually may comprise a continuation of internal tapered surface 27. The threaded portion 158 is provided to receive a retaining nut 161 for securing the spindle portion 25 in fixed longitudinal relation to the spring rod 101. The elongated bearing surface 159 formed integrally with or mounted concentrically on the threaded portion 158 of spring rod 101 is provided to support portions of the dynamic balancing assembly 39 described in detail below.

Recalling that the spindle portion 25 includes a relatively large sleeve portion 77 projecting therefrom, this sleeve portion along with a cover plate 167 secured thereto by suitable attachment bolts 168 provides a housing for portions of the semi-automatic dynamically actuated balancing assembly 39 which will be described in detail below with reference to the showing in FIGS. 1, 2, 3 and 4.

Three anti-friction bearing assemblies 171 positioned on bearing surface 159 by means of suitable spacers 172 and secured by a retaining ring 173 engaged in a groove 174 adjacent the outer end of bearing surface 159 provide rotatable support for three pendulum weights 175 respectively provided with pendulum locating pins 176, 176' and 176" projecting to points in a common plane perpendicular to the axis of rotation of the pendulum weights as shown best in FIG. 2. The respective pendulum locating pins threadably engaged with the respective pendulum weights 175 may conveniently be secured against displacement after they have been properly adjusted by providing a slot 177 in the end of each pendulum weight to form a resilient leaf 178 which may be engaged by a pair of lock screws 179 in the manner best illustrated in FIG. 3. With this arrangement tightening lock screws 179 against the leaf 178 applies a load on the threads of the locating pin 176 so that it cannot be accidentally displaced from its proper position relative to the pendulum weight 175 in which it is mounted. From consideration of the showings in FIGS. 2 and 4, it will be apparent that the disposition of locating pins 176' and 176" is such as to preclude disposing the respective pendulum weights 175 in alignment on a single radius. This feature combined with the presence of three weights in this device precludes rendering the dynamic balancing assembly 39 inoperable by any chance adverse disposition of the weights.

The respective pendulum weights 175 are normally constrained against rotation on the bearing assemblies 171 by a locking ring 181 slidably mounted on the external surface of the relatively small sleeve portion 79 of spindle portion 25 and including an annular serrated portion 182, formed integrally therewith or mounted coaxially thereon, normally effective when disposed in the position indicated in dotted lines in FIG. 3 to constrain the respective pendulum weights 175 against rotation by engagement with the exposed ends of the respective pendulum locating pins 176, 176' and 176". The displacement of the locking ring 181 to the right on sleeve 79 is limited by a plurality of threaded adjustable stop screws 183 projecting therefrom and the movement of the locking ring 181 to the left on sleeve 79 is limited by a retaining flange 184 secured to the open end of sleeve 79 by a plurality of suitable attachment screws 185. The locking ring 181 is provided with a plurality of recesses 186 to receive a corresponding plurality of biasing springs 187 interposed between the locking ring 181 and the spindle portion 25, so that the serrated portion 182 of locking ring 181 is normally biased into the position shown in FIGS. 1 and 2 and in dotted lines in FIG. 3 to engage and restrain the pendulum locating pins projecting from the respective pendulum weights 175.

Noting that the locking ring should be constrained against rotation relative to the spindle portion 25 on which a rotating element such as a grinding wheel 36 is mounted, this constraint is provided in the illustrative embodiment of the instant invention by the inclusion of suitable recesses 186' in alignment with the respective recesses 186 in locking ring 181 to receive the other ends of the respective biasing springs 187. With this arrangement, the respective springs 187 serve also as resilient driving pins to maintain a constant angular relationship between the locking ring 181 and the spindle portion 25. For most applications this arrangement is sufficient. However, if further constraint is necessary in certain applications, this can be supplied readily by providing interfitting splines on the sleeve portion 79 and the locking ring 181, or by providing interfitting pins and recesses in the respective parts corresponding to the arrangement of drive pin 57 and recess 58 illustrated in FIGS. 1 and 2.

The locking ring 181 is controlled by a plurality of assemblies connected to a flange 191 secured to or formed integrally with spindle portion 24 and passing through a corresponding plurality of longitudinally extending openings 192 through spindle portion 25. Each of these assemblies includes a length of flexible cable 193, end fittings 194 and 194' secured to the respective ends of the flexible cable 193, an adjustable sleeve 195 engaging end fitting 194 and threadably engaged in the locking ring 181, a socket 201 secured by a suitable set screw 202 in a suitable recess 203 in flange 191, and provided with an opening 204 in the end thereof to receive the flexible cable 193 so that the end fitting 194' may be biased against a fixed reference stop pin 206 by means of a biasing spring 205 relatively much heavier than the biasing springs 187. Each adjustable sleeve 195 threadably engaged in locking ring 181 may be secured in the desired position by providing a slot 207 in the periphery of locking ring 181 to form a resilient leaf 208 engaged by a pair of lock screws 209 in a manner corresponding to the arrangement illustrated in FIG. 3 for securing the respective pendulum locating pins. The locking arrangement for the respective adjustable sleeves 195 is best illustrated by the showing in FIG. 4.

The arrangement of the apparatus necessary to selectively initiate and automatically complete a balancing operation according to the teachings of the instant invention is best illustrated by the simplified schematic representation in FIG. 5.

A sump or reservoir 210 contains a supply of suitable pressure fluid for circulation through pressure conduit 212 by operation of a suitable pump P driven by means such as an electric motor controlled by switch SW2. The desired fluid pressure is maintained by means of a relief valve 211 connected to a return conduit 216. The control valve assembly V1 to which pressure conduit 212 and return conduit 216 are connected contains a valve spool assembly 220 including a plurality of piston portions defining valve chambers 222, 224 and 226 and provided with a central passage 228 interconnecting valve chambers 222 and 226. The valve spool assembly 220 is normally positioned as shown in FIG. 5 by biasing spring 229, except when solenoid S1 is energized to bias the valve spool assembly 220 to the left. The valve assembly V1 is connected to the cylinder assembly 111 of the linear actuator assembly 29 by means of fluid conduits 112 and 116 for selective delivery of pressurized fluid by cylinder chambers 114 and 118.

The machine cycle by which the grinding wheel 36 is advanced into engagement with a workpiece for a desired grinding operation is initiated by a control circuit including normally closed contacts of control relay CR1, normally closed contacts of a "stop" switch controlled by push button PB3, normally open contacts of a "start" switch controlled by push button PB2, and normally open contacts of control relay CR2, closed when the coil of control relay CR2 is energized to form a holding circuit for the machine cycle after the starting switch is released by releasing push button PB2.

The control circuit for operating the semi-automatic dynamically actuated balancing assembly 39 includes the normally open contacts of a starting switch controlled by push button PB1, normally closed contacts of control relay CR2, initially closed contacts of a time delay relay TR1, the coil of control relay CR1, warning light L, and the coil of time delay relay TR1. The latter circuit also controls a pair of normally open contacts of control relay CR1 arranged so that solenoid S1 of the valve assembly V1 is energized when these normally open contacts are closed.

The details of the machine cycle have been omitted from the showing in FIG. 5, because they form no part of the instant invention. The device comprising the instant invention is suitable for use with grinding machines having various different well-known wheel feed control systems and with other types of machine tools, as well as devices other than machine tools.

From consideration of the showing in FIG. 5, it will be apparent that the machine cycle control circuit and the automatic dynamic balancing assembly control circuit are interlocked so that energization of either of these circuits locks out the energization of the other control circuit. Accordingly, the following description of the operation of the apparatus comprising the instant invention may be taken as beginning upon the completion of a machine cycle with the grinding wheel 36 withdrawn from engagement with the workpiece as is customary upon completion of a typical grinding machine operating cycle.

In order to initiate automatic operation of the dynamically actuated balancing assembly 39, an operator depresses and holds down a push button PB1 to energize the coil of time delay relay TR1, to illuminate a red warning light L, and to energize the coil of control relay CR1. The red warning light L remains illuminated only so long as the coil of relay CR1 is energized. The energization of the coil of control relay CR1 opens its normally closed contacts to lock out the control circuit for the grinding machine cycle and closes its normally open contacts to energize solenoid S1 in valve assembly V1 to displace the valve spool assembly 220 to the left as shown in FIG. 5, biasing spring 229 so that pressurized fluid passes from pressure conduit 212 to valve chamber 224 and thence through fluid conduit 116 into the cylinder chamber 118 to drive the piston assembly 107 to the left in cylinder assembly 111 as shown in FIGS. 1 and 5. At the same time, fluid expelled from cylinder chamber 114 through fluid conduit 112 passes into valve chamber 226 and through central passage 228 to valve chamber 222 and thence through return conduit 216 to the sump 210. At the predetermined time interval after energization of the coil of time delay relay TR1 sufficient to complete a balancing operation, the normally closed contacts of TR1 are opened deenergizing the coil of control relay CR1 to open the normally open contacts thereof and thereby deenergize the solenoid S1 of valve assembly V1. With solenoid S1 deenergized, the valve spool assembly 220 is returned to the position shown in FIG. 5 so that fluid is released from cylinder chamber 118 and pressurized fluid is delivered to cylinder chamber 114 to return piston assembly 107 to the right as shown in FIGS. 1 and 5.

When the piston assembly 107 of the linear actuator assembly 29 is displaced to the left in the manner described above, the spring rod 101 displaces spindle portion 25 longitudinally relative to spindle portion 24 to disengage tapered surface 27 from tapered surface 26. This relative longitudinal displacement continues until spindle portions 24 and 25 reach the relative positions illustrated in FIG. 2 in which the left hand end of spring rod 101 is free to oscillate about the normal axis of rotation in response to an unbalanced condition of the rotating element supported thereby, illustrated in FIG. 2 as a grinding wheel 36. Continued displacement of the spring rod 101 by the piston assembly 107 moves spindle portion 25 ultimately to the position represented by the phantom line on the left hand side of FIG. 2. However, the lengths of the respective flexible cables 193 and the adjustments of the respective sleeves 195 cooperating therewith are such that the locking ring 181 is constrained from displacement from the position in which it is shown in FIG. 2. Consequently, the final displacement of the spring rod 101 moves the pendulum locating pins 176, 176' and 176" into the position relative to the annular serrated portion 182 illustrated in the solid line portions of FIG. 3, constituting an exaggerated representation of the relative displacement of these parts. With the respective locating pins disengaged from the locking ring 181, the pendulum weights 175 are free to rotate about their respective antifriction bearing assemblies 171 to seek the position in which they offset any unbalance in the grinding wheel 36. The manner in which the respective pendulum weights 175 coact to offset an unbalanced condition of a rotating element such as the grinding wheel 36 illustrated will not be discussed in detail herein since this principle is well known in the art, as indicated in Thearle Patent No. 1,967,163 and elsewhere in the literature. Instead, it is considered sufficient to note that the respective pendulum weights 175 will seek appropriate angular orientations about the elongated bearing surface 159 of the spring rod 101 such that they will compensate for an unbalanced condition, rotating with and remaining relatively fixed in their angular relation to the rotating element with which they coact.

In order to secure the pendulum weights 175 in the balanced disposition, the sequence described above is reversed. That is, when the solenoid S1 is deenergized and the piston assembly 107 of the linear actuator assembly 29 is displaced to the right, as described above, the initial displacement of the spring rod 101 brings the ends of the respective pendulum locating pins 176, 176' and 176" into inter-fitting engagement with the annular serrated portion 182 of locking ring 181. Thus, the respective pendulum weights 175 are constrained against rotation relative to the rotating element with which they coact, even when the drive motor 31 is deenergized so that the rotating element such as a grinding wheel 36 comes to rest. Continued displacement of the spring rod 101 to the right first brings the chamfered edge 152 into engagement with the chamfered face 154 of the cylindrical seat 153 to guide boss 151 into engagement with seat 153 to constrain the spindle portion 25 in substantial axial alignment with spindle portion 24. Thereafter, continued displacement of the spring rod 101 to the right brings the internal tapered surface 27 of spindle portion 25 into interfitting engagement with the external tapered surface 26 of spindle portion 24 to position the respective spindle portions in precise axial alignment.

The clearance between the boss 151 and the cylindrical seat 153 may be selected so that these elements are not in load-carrying bearing engagement when the respective tapered surfaces 26 and 27 are fully engaged. Thus, the boss 151 and the cylindrical seat 153 may be limited to an intermediate positioning and supporting function as the rotating element is shifted from the position in which it is balanced to the position in which it rotates about the axis of rotation of the spindle assembly.

While the spindle reciprocating mechanism may be deactivated selectively as desired, there is no necessity for interrupting the reciprocation of the spindle assembly for the balancing operation, because the longitudinal movement of the spindle assembly has no effect on the successful operation of the balancing assembly 39 operable in the plane perpendicular to the longitudinal axis of the spindle assembly 23.

It will be apparent from the showing in FIG. 6 of an alternative embodiment of the instant invention, that this invention is not limited in its application to arrangements for balancing a rotating element supported in cantilevered relation to a plurality of bearing assemblies all on one side of the rotating element. In the embodiment illustrated in FIG. 6, the various elements directly corresponding to the respective elements of the preferred embodiment of the instant invention illustrated in FIGS. 1, 2, 3 and 4 are identified by the same reference numerals. However, the elongated bearing surface 159' is shown substantially enlarged and elongated so that it projects through the cover plate 167' to engage an additional spindle supporting assembly generally designated by reference numeral 241, and particularly the inner races of anti-friction bearing assemblies 242 secured to spring rod 101 by means of retaining nut 243 threadably engaging a suitable threaded portion at the end of bearing surface 159'. The spindle supporting assembly 241 also includes an annular housing assembly 244 secured in clamping engagement with the outer races of the bearing assemblies 242 and provided with an annular boss 247 having a chamfered edge 245 for engagement with the chamfered edge 248 of a cylindrical seat 246 formed concentrically of an inwardly extending flange on a sleeve 249 formed integrally with or attached by suitable attachment means to a support 250 which may comprise the cover plate for a reinforced wheel guard assembly, positioned relative to the wheel guard assembly by a locating pin 251 and secured by attachment bolts 253.

In order to accommodate oscillation of the spindle supporting assembly 241 with the spring rod 101 during balancing operations, the sleeve 249 and the support 250 are provided with enlarged internal recesses 254 and 256, offset eccentrically of the axis of rotation toward the underside of sleeve 249 to accommodate the tendency for the spring rod 101 to deflect downwardly as the spring rod and the various elements it supports are displaced to the left as shown in FIG. 6 for the balancing operation.

In addition, in order to constrain the spindle supporting assembly 241 against rotation without constraining it against oscillation during the balancing operation, the sleeve 249 is provided with a radial longitudinally extending slot 258 arranged to receive a radially extending resilient finger 260 fixedly secured at its inner end to the annular housing assembly 244 by suitable means such as the screw shown in FIG. 6.

The operation of the embodiment of the instant invention illustrated in FIG. 6 is generally similar to that of the embodiment illustrated in FIGS. 1–4, with the exception of the fact that displacement of the spring rod 101 to the left as shown in FIG. 6 will result first in disengaging tapered surface 27 from tapered surface 26, then in disengaging boss 151 from cylindrical seat 153, and finally in disengaging the annular boss 247 from the cylindrical seat 246 as the elements supported by the spring rod 101 approach a position corresponding to that illustrated in FIG. 2 for the preferred embodiment of the instant invention. The last step in this modified sequence of operations provides for disengagement of spindle portion 25' from the bearing support provided by support 250 through the spindle supporting assembly 241 including bearing assemblies 242, in order to create the operating conditions under which the balancing assembly 39 may function in the manner described above to balance the grinding wheel 36'. Conversely, after the pendulum weights 175 are secured in their balanced orientation by the initial movement of spring rod 101 to the right toward the position shown in FIG. 6, the chamfered edge 245 of the annular boss 247 first engages the chamfered edge 248 of cylindrical seat 246 as the annular boss 247 is displaced longitudinally into engagement with the cylindrical seat 246 to restore the additional bearing support for spindle portion 25' provided by the coacting spindle supporting assembly 241 and support 250. Thereafter, the chamfered edge 152 of boss 151 engages the chamfered face 154 adjoining the cylindrical seat 153 to align boss 151 with the cylindrical seat 153 as the boss 151 is moved into engagement with cylindrical seat 153. Finally, after spindle portion 25' is brought into substantial axial alignment with spindle portion 24 by the interengagement of the boss 151 with the cylindrical seat 153, continued displacement of the spring rod 101 to the right as shown in FIG. 6 brings tapered surface 27 into inter-fitting engagement with tapered surface 26 to position the respective spindle portions 25' and 24 in precise axial alignment.

From consideration of the description of the instant invention provided herein with respect to two embodiments of this invention, it will be apparent that the various objects set forth hereinabove may be achieved with many thoroughly practical advantages in diverse applications of the teachings of the instant invention. Hence, since the instant invention may be incorporated in many practical embodiments thereof and since many changes might be made in the embodiments thereof described above within the scope of the appended claims, it is to be understood that all matter hereinbefore set forth and shown in the accompanying drawings is to be interpreted as illustrative only and not in a limiting sense.

What is claimed is:

1. In a balancing apparatus for a rotating element, a support, a spindle assembly rotatably mounted on said support for rotation about a fixed predetermined axis at a predetermined operating speed, said spindle assembly including a section thereof selectively disposed in a first position to support the rotating element attached thereto for rotation about said fixed predetermined axis and in a second position in which the critical speed of said section is less than said operating speed for automatically balancing the rotating element supported by said section of said spindle assembly, balancing means including a plurality of weights freely rotatable relative to said section in response to unbalanced dynamic forces acting on said balancing means when said section is disposed in its second position until said balancing means is positioned to balance the rotating element supported by said section, an actuating means mounted on said spindle assembly and connected to said section operable in one direction to move said section relative to the remainder of said spindle assembly from its first position to its second position and to release said balancing means for free rotation relative to said section into the balanced position and operable in the other direction to secure said balancing means in the balanced position for the rotating element mounted on the spindle assembly and to move said section relative to the remainder of said spindle assembly from its second position to its first position.

2. In a machine tool having a base and a support for a rotating tool mounted on the base, a spindle assembly rotatably mounted on the support for rotation about a fixed predetermined axis at a predetermined operating speed and including a spindle segment selectively disposed concentric of said fixed axis in a first position to support the rotating tool attached thereto for rotation about said fixed predetermined axis and in a second position in which the critical speed of said spindle segment is less than said operating speed for automatically balancing the rotating tool fixedly mounted upon said spindle segment, balancing means automatically operable in response to centrifugal forces acting upon said balancing means when said spindle segment is disposed in its second position to balance the rotating tool attached thereto, a linear actuating means mounted centrally within said spindle assembly and connected to said spindle segment so as to provide radially resilient support for said spindle segment in its second position operable in one direction to move said spindle segment from its first position to its second position and to release said balancing means for automatic operation and operable in the other direction to secure said balancing means in the balanced position for a given rotating tool mounted upon said spindle segment and to move said spindle segment from its second position to its first position.

3. A device as claimed in claim 2, wherein said balancing means includes a plurality of eccentrically weighted means mounted for rotation about said linear actuating means, and means positioned by said linear actuating means so disposed as to secure said eccentrically weighted means against rotation relative to said spindle segment when said linear actuating means is in the first position and so disposed as to release said eccentrically weighted means for rotation relative to said spindle segment when said linear actuating means is in the second position.

4. A device as described in claim 2, wherein the linear actuating means includes an elongated unitary spring member disposed centrally of said spindle assembly and arranged to support said spindle segment and a rotating tool thereon yieldably in cantilevered relation to said support when said spindle segment is disposed in said second position.

5. A machine tool assembly comprising a base, a tool supporting means mounted upon said base, a rotatable tool, an elongated spindle assembly rotatably mounted in said tool supporting means and arranged to support said rotatable tool thereon, a drive means operatively connected to rotate said spindle assembly at a predetermined operating speed, said spindle assembly including a first relatively fixed spindle portion mounted continually in bearing engagement with and in a fixed orientation relative to said supporting means and a second relatively movable spindle portion to which said rotatable tool is fixedly secured, a releasable bearing means attached to said second spindle portion, a linear actuator including an elongated cantilevered member interconnecting said first spindle portion and said second spindle portion selectively operable while said spindle assembly is rotating to move said second spindle portion longitudinally of said spindle assembly between a first position in fixed interfitting engagement with said first spindle portion and a second position out of engagement with said first spindle portion in which said second spindle portion is yieldably supported radially of said spindle assembly so that the critical speed of said second spindle portion is less than said operating speed, and balancing means automatically operable in response to dynamic forces acting on said balancing means when said second spindle portion is disposed in said second position out of engagement with said first spindle portion to balance said rotatable tool, said releasable bearing means being disposed in bearing engagement with said supporting means when said second spindle portion is disposed in said first position and disposed out of engagement with said supporting means when said second spindle portion is disposed in said second position.

6. Balancing apparatus comprising supporting means, a spindle assembly mounted in said supporting means for rotation about a fixed axis, a rotatable element secured to said spindle assembly for rotation therewith, a drive means operatively connected to rotate said spindle assembly at a predetermined operating speed, said spindle assembly including a first relatively fixed spindle portion and a second relatively movable spindle portion to which said rotatable element is secured, an actuator selectively operable while said spindle assembly is rotating to move said second relatively movable spindle portion between a first position in coaxial interfitting engagement with said first relatively fixed spindle portion and a second position out of engagement with said first fixed spindle portion in which the critical speed of said second spindle portion is less than said operating speed, and balancing means operable in response to centrifugal forces acting on said balancing means when said second spindle portion is out of engagement with said first spindle portion to balance the rotatable element, said actuator including a unitary substantially elongated resilient member connected at one end to said second spindle portion and supported at the other end in bearing engagement with said first spindle portion, said unitary resilient member being effective when said actuator is operated to displace said second spindle portion from and to said first and said second positions, effective in said first position to maintain said second spindle portion fixedly in coaxial interfitting engagement with said first spindle portion for rotation therewith about said fixed axis, and effective in said second position to support said second spindle portion resiliently for oscillation about said fixed axis during the balancing operation.

7. Balancing apparatus comprising supporting means, a spindle drive means operable at a predetermined operating speed, a spindle assembly rotatably mounted in said supporting means including a first relatively fixed spindle portion operatively connected to said spindle drive means and supported for continuous rotation about a fixed axis at said operating speed and a second relatively movable spindle portion to which a rotatable element is fixedly secured for rotation therewith, an actuator drivably interconnecting said first spindle portion and said second spindle portion and selectively operable to move said second relatively movable spindle portion axially of said spindle assembly between a first position in coaxial interfitting engagement with said first relatively fixed spindle portion and a second position out of engagement with said first relatively fixed spindle portion in which the critical speed of said second spindle portion is less than said operating speed, said actuator including a resilient means interconnecting said first spindle portion and said second spindle portion so that said second spindle portion is resiliently supported and driven by said first spindle portion through said resilient means when said second spindle portion is in its second position, and balancing means operable in response to centrifugal forces acting thereon when said second spindle portion is resiliently supported in its second position to balance a rotating mass supported and rotated by said first spindle portion including said second spindle portion and a rotatable element secured to said second spindle portion.

8. A device as described in claim 7, wherein said resilient means comprises a single cantilevered elongated spring member disposed concentrically of and within said first spindle portion.

9. A device as claimed in claim 8, wherein said balancing means includes a plurality of unbalanced weighted means mounted with said second spindle portion upon said elongated spring member for rotation about said elongated spring member, and means controlled by said actuator selectively operable to secure said weighted means simultaneously against rotation relative to said second spindle portion and to release said weighted means simultaneously for rotation relative to said second spindle portion.

10. Dynamically actuated balancing apparatus comprising supporting means, an elongated spindle assembly rotatably mounted in said supporting means for rotation about a fixed axis in response to a drive means operatively connected to rotate said spindle assembly at a predetermined operating speed to drive a rotatable member fixedly mounted upon said spindle assembly for rotation therewith, said spindle assembly including a first spindle portion relatively fixed longitudinally of said spindle assembly, a second spindle portion relatively movable longitudinally of said spindle assembly, a linear actuator selectively operable with said spindle assembly rotating to move said second spindle portion between a first position in interfitting engagement with said first spindle portion and a second position out of engagement with said first spindle portion in which the critical speed of said second spindle portion is less than said operating speed, said linear actuator including a resilient supporting member interconnecting said first spindle portion and said second spindle portion so that said second spindle portion is supported and driven through said resilient supporting member when said second spindle means is in said second position, and dynamically actuated balancing means operable when said second spindle portion is out of engagement with said first spindle portion to balance a mass including said second spindle portion and a rotatable member mounted on said second spindle portion while said spindle assembly is rotating, said balancing means including a plurality of active balancing elements each including an unbalanced weighted portion mounted with said second spindle portion upon said resilient supporting member for rotation about said resilient supporting member in response to dynamic forces acting upon the respective balancing elements, and locking means controlled by said linear actuator engaging said balancing elements in the first position to secure said balancing elements against rotation relative to the rotatable member mounted upon said second spindle portion and disengaged from said balancing elements in the second position to release said balancing elements for rotation relative to the rotatable member mounted upon said second spindle portion.

11. A device as described in claim 10, wherein said resilient supporting member comprises an elongated cantilevered spring member to one end of which said second spindle portion is fixedly secured and the other end of which is mounted slidably and non-rotatably in coaxial bearing engagement with said first spindle portion.

12. A machine tool assembly comprising a base, a supporting means mounted upon said base, a spindle assembly rotatably mounted in said supporting means arranged to support a rotatable tool thereon, and a spindle drive means operable at a predetermined operating speed, said spindle assembly including a first relatively fixed spindle portion operatively connected to said spindle drive means for continuous rotation thereby about a fixed predetermined axis at said operating speed, a second relatively movable spindle portion supporting a rotatable tool fixedly secured thereto, a linear actuator interconnecting said first spindle portion and said second spindle portion cyclically operable to move said relatively movable spindle portion axially of said spindle assembly between a first position in fixed coaxial interfitting engagement with said relatively fixed spindle portion and a second position out of engagement with said fixed spindle portion in which said relatively movable spindle portion is resiliently supported by said actuator and driven by said first spindle portion through said actuator so that the critical speed of said second spindle portion is less than said operating speed, and balancing means automatically operable in response to centrifugal forces acting thereon while said movable spindle portion is out of fixed interfitting engagement with said fixed spindle portion to balance the rotatable tool fixedly secured to the relatively movable spindle portion of said spindle assembly.

13. A device as described in claim 11, and, in addition, a plurality of spaced bearing means interposed between said supporting means and said first spindle portion, each fixedly secured to said supporting means and continually disposed in bearing engagement with said first spindle portion, said plurality of spaced bearing means being collectively effective through said first spindle portion and said linear actuator to maintain the axis of rotation of said second spindle portion coincident with said fixed predetermined axis when said second spindle portion is disposed in said first position.

14. A device as described in claim 11, and, in addition, a plurality of spaced bearing means interposed between said supporting means and said first spindle portion, each fixedly secured to said supporting means and continually disposed in bearing engagement with said first spindle portion, and releasable bearing means attached to and movable with said second spindle portion, said releasable bearing means being disposed in bearing engagement with said supporting means when said second spindle portion is in said first position and disposed out of engagement with said supporting means when said second spindle portion is in said second position.

15. A driven spindle assembly mounted in a supporting means for rotation about a fixed horizontal axis at a predetermined operating speed, said spindle assembly including a first relatively fixed driving spindle portion, a second relatively movable driven spindle portion supporting a rotatable tool fixedly secured thereto, an actuator including a radially resilient supporting means drivably interconnecting said first spindle portion and said second spindle portion and also selectively operable to move said second relatively movable spindle portion axially between a first position in radially fixed concentric interfitting engagement with said first relatively fixed spindle portion and a second position out of engagement with said fixed spindle portion and radially resiliently supported by said actuator so that the critical speed of said second spindle portion is less than said operating speed, and balancing means operable when said second spindle portion is out of engagement with said first spindle portion to balance the rotatable tool mounted on said spindle assembly, said balancing means including a plurality of pendulum means supported by said actuator for free rotation relative to said spindle assembly and locking means actuated by said actuator effective whenever said second spindle portion is not in the second position to secure said pendulum means against rotation relative to said spindle assembly and disengaged in the second position from said pendulum means, whereby said pendulum means may rotate freely relative to said spindle assembly in response to centrifugal forces thereon to balance a rotating tool mounted upon said spindle assembly.

16. In balancing apparatus, a spindle assembly arranged to accommodate a balancing means selectively automatically operable to balance a rotatable element supported by the spindle assembly, comprising a first relatively fixed spindle portion supported for continuous rotation about a fixed axis at a predetermined operating speed, a second relatively movable spindle portion to which a rotatable element is fixedly secured for rotation therewith, and an actuator drivably interconnecting said first spindle portion and said second spindle portion and selectively operable to move said second relatively movable spindle portion between a first position in coaxial inter-fitting engagement with said first relatively fixed spindle portion and a second position out of engagement with said first relatively fixed spindle portion in which the critical speed of said second spindle portion is less than said operating speed, said actuator including a resilient elongated member interconnecting said first spindle portion and said second spindle portion so that said second spindle portion is resiliently supported and driven by said first spindle portion through said resilient elongated member when said second spindle portion is in its second position.

17. In apparatus for balancing a rotating tool, a spindle assembly mounted for rotation about a fixed predetermined axis at a predetermined operating speed including a relatively movable portion selectively disposed concentric of said fixed axis in a first position to support a rotating tool attached thereto for rotation about said fixed predetermined axis and in a second position in which the critical speed of said portion is less than said operating speed to accommodate means for automatically balancing a rotating tool mounted upon the relatively movable of said spindle assembly, a linear actuating means mounted centrally within said spindle assembly and connected to said portion thereof so as to provide radially resilient support for said portion in its second position and operable in one direction to move said portion axially of said spindle assembly from its first position to its second position and operable in the other direction to move said portion axially of said spindle assembly from its second position to its first position.

References Cited in the file of this patent

UNITED STATES PATENTS

| | | |
|---|---|---|
| 2,164,900 | Campbell | July 4, 1939 |
| 2,507,558 | Dall et al. | May 16, 1950 |
| 2,534,269 | Kahn et al. | Dec. 19, 1950 |
| 2,814,944 | Brown | Dec. 3, 1957 |
| 2,882,745 | Comstock | Apr. 21, 1959 |
| 2,882,746 | Largen | Apr. 21, 1959 |
| 2,915,918 | Comstock | Dec. 8, 1959 |
| 2,942,494 | Gooch | June 28, 1960 |

FOREIGN PATENTS

| | | |
|---|---|---|
| 287,960 | Switzerland | Apr. 16, 1953 |